Oct. 13, 1970 B. SEGMÜLLER 3,533,594
HOT CHANNEL-INJECTION MOLDING DEVICE
Filed Aug. 18, 1967 3 Sheets-Sheet 1

BRUNO SEGMÜLLER
INVENTOR.

BY Jacobi & Davidson
ATTORNEYS

Oct. 13, 1970  B. SEGMÜLLER  3,533,594
HOT CHANNEL-INJECTION MOLDING DEVICE
Filed Aug. 18, 1967  3 Sheets-Sheet 2

BRUNO SEGMÜLLER
INVENTOR.

BY Jacobi & Davidson
ATTORNEYS

United States Patent Office 3,533,594
Patented Oct. 13, 1970

3,533,594
HOT CHANNEL-INJECTION MOLDING DEVICE
Bruno Segmüller, Stein am Rhein, Switzerland, assignor to Segmuller AG., Stein am Rhein, Switzerland, a corporation of Switzerland
Filed Aug. 18, 1967, Ser. No. 661,626
Claims priority, application Switzerland, Aug. 19, 1966, 12,000/66
Int. Cl. B29f 1/00
U.S. Cl. 249—107
11 Claims

ABSTRACT OF THE DISCLOSURE

A hot channel-injection molding device comprising mold means incorporating an infeed portion and a number of injection nozzles. A channel system including branched channel means is disposed between the infeed portion and the aforesaid number of injection nozzles, with the length of said branched channel means between said infeed portion and the individual injection nozzles being substantially equal. The branched channel means are distributed at least at two planes, and each such plane only possesses branched channel means of the same order or classification.

BACKGROUND OF THE INVENTION

The present invention relates to an improved hot channel-injection molding device equipped with a branched channel system provided between an infeed location and a plurality of injection nozzles, wherein the length of the channels between the aforesaid infeed location and the individual injection nozzles are equal.

It is known to be important both for the construction of multiple-hot channel-injection molding devices as well as also single-hot channel-injection molding devices having a plurality of injection nozzles, that the flow paths for the injection molding material are equal from the infeed location to the individual injection nozzles used for the production of the injection molded articles. In other words, the channel length of the distributor or runner channels should be as equal as possible from the infeed location to the individual injection nozzles.

The same length of the distributor channels enables the most uniform or constant injection pressure to be preserved at the injection nozzles and at the same time also brings about a practically uniform temperature condition of the injection molding material at the injection nozzles for the individual injection molded articles or individual portions or parts of such articles.

It is necessary to strive for these conditions in order to obtain a uniform and optimually economical finished product. These conditions could indeed be obtained in multiple-injection molding devices which are constructed in such a manner that at the finished product there appears a sprue or waste piece which must be removed at a later time in a special working operation. However, with the so-called hot channel-injection molding device, that is to say with sprueless injection molding devices, this has not yet been possible to date.

Due to the high pressure which occurs with hot channel-injection molding devices, it is not possible to divide the mold or tool block for producing the distributor channels disposed in one plane, along the distributor channel plane, since a large separation plane cannot be properly sealed. Accordingly, the mold or tool block must, therefore, practically consist of a single piece from the infeed or feed location to the individual injection nozzles, with the result that considerable difficulties appear during the production of the distributor channels.

In order to achieve the previously mentioned conditions or prerequisites at hot channel-injection molding devices, there has for instance already been attempted at such hot channel-injection molding devices, to provide from a central sprue discharge channels which extend in star-like fashion towards the injection nozzles arranged along a circle. This arrangement, which is situated in one plane, however is limited in its size by the size of the machine plate, whereby the number of injection molds for the injection molded articles is also limited.

Furthermore, in order to obtain the aforementioned purpose it has already been attempted at mulitple-hot channel-injection molding devices, to arrange the distributor channels in one plane with flow paths of different lengths, and to provide self-closing nozzles instead of the injection nozzles which remain open. The purpose of these self-closing nozzles is to obtain a pressure equilibrium within the distributor channel system which is disposed in one plane, so that upon application of the injection pressure by the injection unit of the injection molding machine there occurs a uniform introduction or injection of the injection molding material into the individual injection molds. However, a major drawback with this arrangement is the self-closing nozzles themselves, which oftentimes cause disturbances or breakdown.

When molding larger injection molded articles by means of so-called simple or single molds having a plurality of injection nozzles, and even if provided with the same flow path lengths between the infeed location and the individual injection nozzles, nonetheless a correct filling of the mold can only then be achieved if additionally also the fill paths, that is to say the flow paths in the mold compartment itself, with respect to the momentary injection pressure, are substantially the same length for all parts of the injection molded article. This condition has only been fulfilled in exceptional cases in the prior art injection molding devices.

SUMMARY OF THE INVENTION

Accordingly, it is a primary object of the present invention to provide an improved hot channel-injection molding device which does not possess the previously mentioned drawbacks of the prior art hot channel-injection molding devices.

Another, more specific object of this invention relates to an improved hot channel-injection molding device which is constructed in such a manner that it is readily possible to produce in an efficient and economical manner uniform injection molded articles.

Still a further significant object of the present invention relates to an improved construction of hot channel-injection molding device which enables the available mold area to be utilized in a more efficient manner.

A further object of this invention resides in an improved construction of hot channel-injection molding device wherein there is obtained at the same time a uniform filling of all of the mold compartments which are to be filled with the injection molding material, and further wherein such mold compartments are filled under the same pressure conditions.

Yet another noteworthy object of the present invention relates to an improved construction of hot channel-injection molding device which can be manufactured in a relatively simple and inexpensive manner, is extremely efficient in operation, provides for production of the injection molded articles in an extremely rapid manner and resulting in an improved finished product.

Now, in order to implement these and still further objects of the invention which will become more readily apparent as the description proceeds, the inventive hot channel-injection molding device is manifested by the features that the branched channel means are distributed at least at two planes, wherein each plane only possesses branched channel means of the same order or classification.

The inventive hot channel-injection molding device can be constructed as a multiple-injection molding device with one or a number of injection locations for each injection molded article or else as a single-injection molding device having a number of injection locations for each injection molded article.

The branched channel means which are disposed in the same plane advantageously exhibit the same length, and preferably the planes formed by the branched channel means extend in parallelism with respect to one another. In each plane each channel advantageously branches into at least three, preferably into at least four, channels of the next order or classification.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DESCRIPTION OF THE PREFERRED EMBODIMENTS

Figure 1:
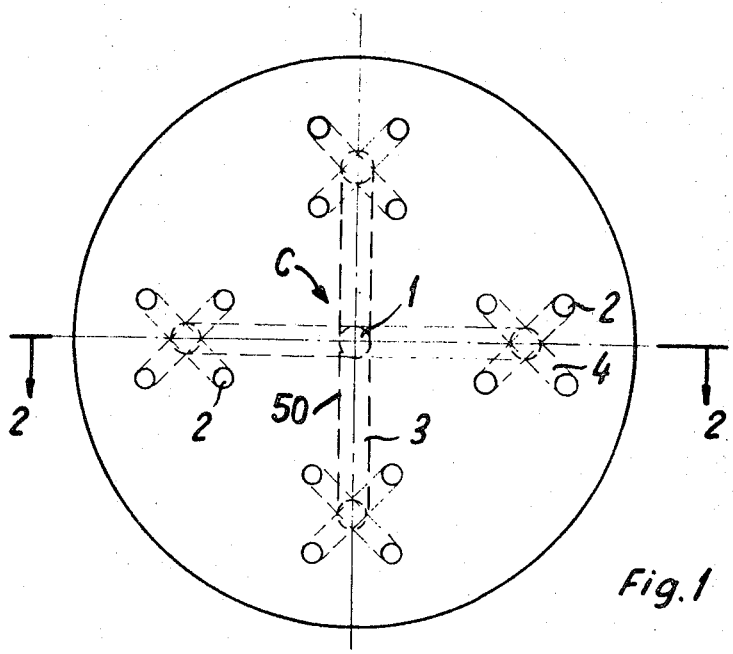
FIG. 1 is a plan view of a first embodiment of inventive hot channel-injection molding device constructed as a multiple-mold or tool, as viewed substantially along the line 1—1 of FIG. 2.
Figure 2:
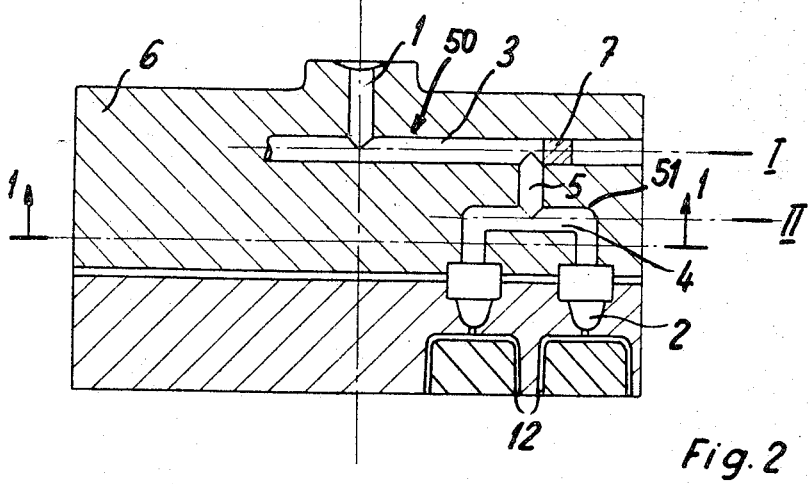
FIG. 2 is a cross-sectional view of the hot channel-injection molding device of FIG. 1, taken along the line 2—2 thereof.

With reference now to the drawings, in FIG. 1 there is shown in plan view a multiple-hot channel-injection molding device equipped with a branched channel system C between an infeed or pouring location 1 and a plurality of injection nozzles 2, and wherein the channel lengths between the infeed location 1 and the individual injection nozzles 2 are equal. As will be clearly recognized by inspecting FIG. 2, the branched channel means 3 of the so-called first order or classification, in other words of the first arrangement, generally designated by reference numeral 50, and the branched channel means 4 of the second order or classification, generally designated by reference numeral 51, are distributed at two planes I and II respectively, which are in substantial parallelism with one another, wherein the branch channel means disposed in the same plane of the same order have the same length. The connecting channel means 5 between the branched channel means 3 and 4 of the neighboring planes I and II extend substantially perpendicular to the latter, so that the injection molding material which is to be injected passes from the branched channel means 3 through the connecting channel means 5 and thereafter uniformly into the branched channel means 4 which are arranged in substantially star-like fashion.

With the previous, prior art arrangement of the branched channel means in one single plane, the operation was such that the radially outwardly directed branched channel means of the second order and the molds connected with such were initially filled, and that only thereafter were the molds connected with the radially inwardly directed branched channel means of the second order completely filled. As a result, considerable fluctuations of the pressure in the branched channel means of the second order could occur at the same period of time, and therefore, also different degree of filling of the individual molds.

Due to the shifting or displacement of successive branched channel means of different order or classification in successive, parallel planes and owing to the connection of the branched channel means of one order with the branched channel means of the next higher order in the neighboring plane by means of connecting channel means which extend perpendicular to such planes, it is possible to produce even complicated channel systems quite easily without the mold means or block of the mold assembly having to be divided in the plane of the branched channel means. Apart from this, there also occurs at the same time a uniform filling of all of the mold compartments or molds 12 which are to be filled with injection molding material, and specifically with the same pressure.

Additionally, with the inventive multiple-injection molding device, it is possible, with given mold or tool dimensions, to accommodate more individual molds or mold compartments than with the conventional channel guide means, or it is possible for the same number of individual molds to reduce in size the tool dimensions. The reason for this is that, with the exception of the center, practically the entire tool or mold assembly cross-section is utilized. Owing to a reduction in the mold dimensions, there is also brought about a reduction of the flow path lengths, and therefore, a reduction of the necessary injection pressure.

The channels of the channel system C are advantageously dimensioned in such a manner that the injection molding material which is to be injected exhibits throughout the entire channel system the same flow velocity at the same time.

The production of the channels themselves can be undertaken in the usual manner in that, they are radially bored from the outside of the mold unit or block 6 into the latter and are sealed to the outside by means of suitable closure stoppers 7.

Figure 3:
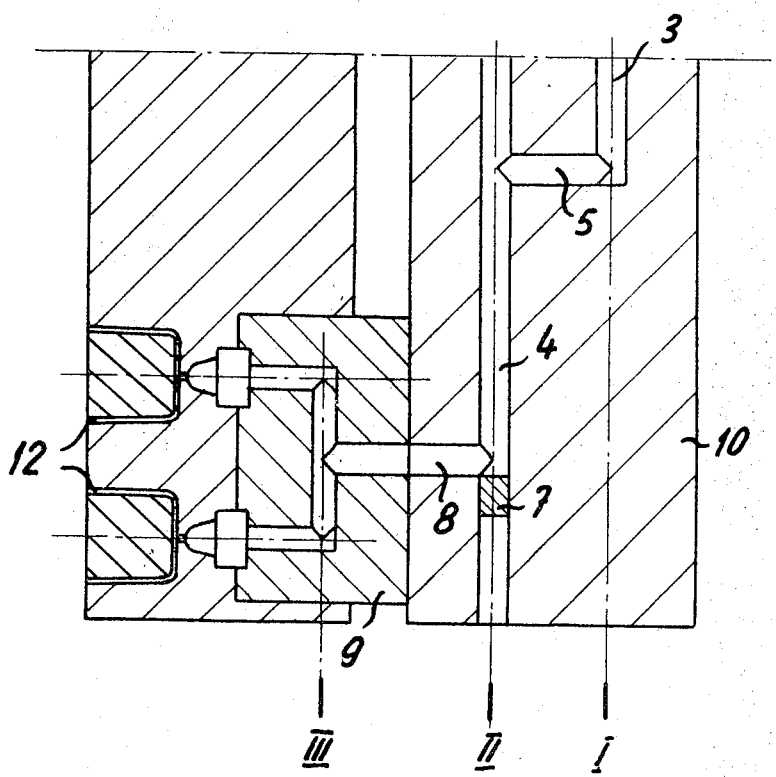
FIG. 3 is a sectional detail of a second embodiment of inventive hot channel-injection molding device which is likewise constructed as a multiple-mold or tool means.

If more than two planes are necessary for arranging the branched channel means and, in so doing, if the channel system cannot be arranged in a single block for constructional reasons, the the possibility exists of constructing the tool or mold unit as shown in FIG. 3. More precisely, in this case the mold unit or tool is divided between two planes II and III formed by the associated branched channel means. Consequently, only the connecting channel means 8 is divided, and specifically perpendicular to its axis. As a result, sealing problems are considerably simplified in comparison to a separation along the longitudinal axis of the channel means.

Continuing, it should be recognized that the connecting piece 9 of the injection molding device can be either rigidly connected with the upper portion 10 or can be pressed against such upper portion 10 by the action of the closing pressure of the injection molding machine.

Furthermore, the injection nozzles 2 are advantageously constructed as single- or multiple-nozzles equipped with heat conducting cores, as such has been described in detail in my copending, commonly assigned, U.S. application, Ser. No. 652,068, filed July 10, 1967, and entitled "Injection Nozzle for Hot Channel-Injection Molding Device."

Figure 4:
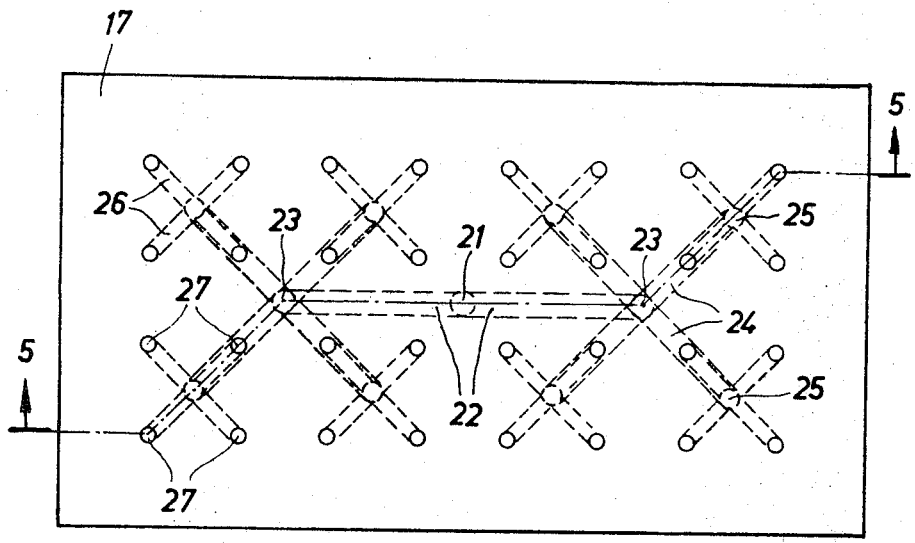
FIG. 4 is a plan view of a further embodiment of inventive hot channel-injection molding device provided with a plurality of injection locations and constructed as a single mold or tool means, and as viewed substantially along the line 4—4 of FIG. 5.
Figure 5:
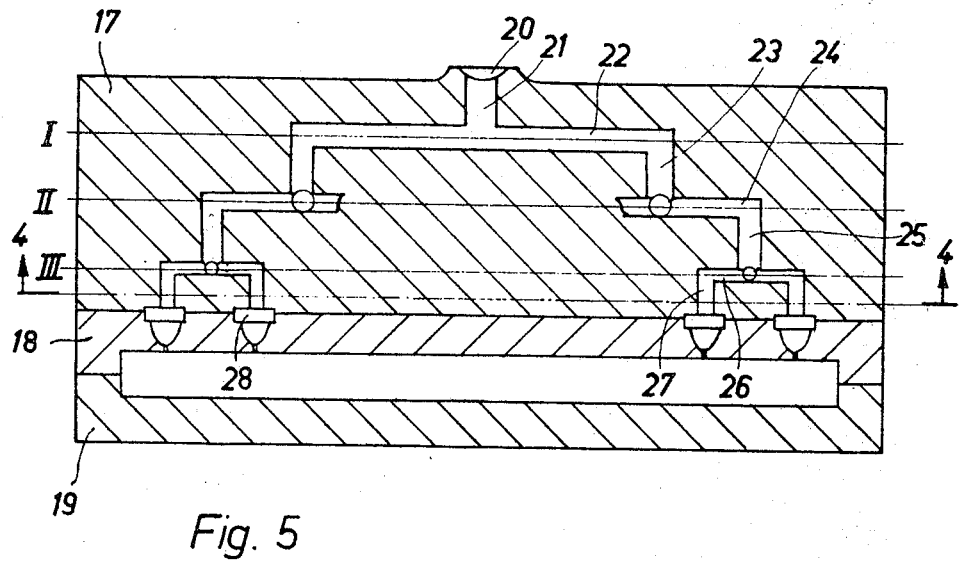
FIG. 5 is a cross-sectional view of the arrangement of FIG. 4, taken along the line 5—5 thereof.

FIGS. 4 and 5 illustrate a single-hot channel-injection molding device having thirty-two injection locations for the injection molding of larger, panel- or sheet-shaped objects. The channel 21 leading away from the infeed or feed location 20 branches into two channels of the first order or arrangement 22 which extend in the first plane I, and which then merge with both of the connecting channel means 23, as shown. The latter, in turn, each branch off in the second plane II into four, in other words a total of eight channels of the second order or arrangement 24, which once again communicate with a respective connecting channel means 25, as shown. Once again, the latter, in turn, each branch off in the third plane III into four, in orther words a total of thirty-two, channels of the third order or arrangement 26, which then merge with a respective delivery channel means 27.

The thirty-two injection nozzles 28 with which the associated delivery channels 27 communicate, are uniformly distributed throughout the entire surface of the injection molded article to be produced in such a manner that each of them supplies a similar size, at least approximately square or quadratic zone or area with injection molding material, in the center of which the associated injection nozzle is disposed. This arrangement not only insures that there will be provided an approximately equal size for the lengths of the flow paths from the infeed location to the injection nozzles, but rather also that the filling path with respect to the momentary injection location will be approximately of the same length for all parts of the injection molded article. Accordingly, it not only possible to manufacture optionally large surfaces, but rather it is also possible to manufacture optionally shaped injection molded articles in a completely trouble-free or faultless manner.

Furthermore, it will be seen that the exemplary embodiment of injection molding device shown in FIGS. 4 and 5 consists of a bipartite upper portion 17, 18 and a counter-member 19.

In the various embodiments of inventive injection molding devices shown in FIGS. 1 to 5, there has not been illustrated the known heating means for the channel system. The heating elements required for the inventive hot channel-injection molding devices in order to continuously maintain the injection molding material heated or plasticized within the channel system, are preferably arranged, in a likewise known manner, such that they can be readily exchanged from externally of the device, and specifically, under certain circumstances, in each of the different planes.

While there is shown and described present preferred embodiments of the invention, it is to be distinctly understood that the invention is not limited thereto, but may be otherwise variously embodied and practiced within the scope of the following claims.

Accordingly, what is claimed is:

1. A hot channel-injection molding device comprising mold means incorporating an infeed portion and a number of injection nozzles, a channel system including branched channel means disposed between said infeed portion and said number of injection nozzles, the length of said branched channel means between said infeed portion and the individual injection nozzles being approximately equal, said branched channel means being distributed in at least two different, spaced planes, each such plane only possessing branched channel means of the same order.

2. A hot channel-injection molding device as defined in claim 1, said mold means being constructed as a multiple-injection molding device for simultaneously producing a plurality of injection-molded articles and possessing at least one injection location for each molded article to be produced.

3. A hot channel-injection molding device as defined in claim 1, said mold means being constructed as a single-injection molding device, possessing a plurality of injection locations for the molded article to be produced.

4. A hot channel-injection molding device as defined in claim 1, wherein said branched channel means situated in the same plane possess the same length.

5. A hot channel-injection molding device as defined in claim 1, wherein the respective planes at which said branched channel means are located extend in parallelism with one another, said channel system including connecting channel means between said branched channel means of two neighboring planes, which extend at least approximately perpedicular to said neighboring planes.

6. A hot channel-injection molding device as defined in claim 1, wherein in each plane each branched channel means branches into at least three channels of the next order of branched channel means.

7. A hot channel-injection molding device as defined in claim 1, wherein in each plane each branched channel means branches into at least four channels of the next order of branched channel means.

8. A hot channel-injection molding device comprising mold means incorporating an infeed portion and a number of injection nozzles, a channel system including branched channel means disposed between said infeed portion and said number of injection nozzles, the length of said branched channel means between said infeed portion and the individual injection nozzles being approximately equal, said branched channel means being distributed in at least two different, spaced planes, each such plane only possessing branched channel means of the same order, said channel system further including connecting channel means leading away from a second plane containing its associated branched channel means which is spaced further from said infeed portion than a first plane containing its associated branched channel means, and said mold means being formed of a single piece from the region of said infeed portion at least to said leading away-connecting channel means.

9. A hot channel-injection molding device comprising mold means incorporating an infeed portion and a number of injection nozzles, a channel system including branched channel means disposed between said infeed portion and said number of injection nozzles, the length of said branched channel means between said infeed portion and the individual injection nozzles being approximately equal, said branched channel means being distributed in at least two different, spaced planes, each such plane only possessing branched channel means of the same order, said mold means further including at least three planes each of which contains respective branched channel means, and said mold means being separated at least once between two neighboring planes.

10. A hot channel-injection molding device as defined in claim 1, wherein the diameters of the channels of said channel system are dimensioned in a manner that the plastic material to be injection-molded in the entire channel system possesses the same flow velocity at the same time.

11. A hot channel-injection molding device as defined in claim 1, said mold means being constructed as a single-injection molding device, possessing a plurality of injection locations for the molded article to be produced, wherein said mold means constructed as a single-injection molding device has said plurality of injection locations distributed across the surface of said mold compartment in such a manner that each such injection location is disposed at least approximately at the center of an at least approximately equal size and at least approximately quadratic region which is supplied by such injection location with injection molding material.

References Cited

UNITED STATES PATENTS

| | | |
|---|---|---|
| 2,524,858 | 10/1950 | Thomas. |
| 2,531,888 | 11/1950 | Nye et al. |
| 2,770,011 | 11/1956 | Kelly. |
| 2,836,853 | 6/1958 | Altmann. |
| 3,021,568 | 2/1962 | Scott. |
| 3,055,055 | 9/1962 | Cook et al. |
| 3,093,865 | 6/1963 | Peters et al. |
| 3,132,381 | 5/1964 | Bowen. |

FOREIGN PATENTS 22,171 10/1961 Germany.

J. HOWARD FLINT, Jr., Primary Examiner

U.S. Cl. X.R.

18—42; 249—110